(12) United States Patent
Chu et al.

(10) Patent No.: US 8,327,349 B2
(45) Date of Patent: Dec. 4, 2012

(54) MATCHING PLUG-INS TO USERS

(75) Inventors: Danae C. Chu, San Jose, CA (US); Shruti Gandhi, Poughkeepsie, NY (US); Zachary A. Garbow, Rochester, MN (US); Clara Chia-Yen Liang, San Jose, CA (US); Timothy M. Trifilo, Latham, NY (US)

(73) Assignee: Internationanl Business Machines Corporation, Armonk, NY (US)

( * ) Notice: Subject to any disclaimer, the term of this patent is extended or adjusted under 35 U.S.C. 154(b) by 1158 days.

(21) Appl. No.: 12/171,572

(22) Filed: Jul. 11, 2008

(65) Prior Publication Data

US 2010/0011352 A1    Jan. 14, 2010

(51) Int. Cl.
*G06F 9/445* (2006.01)
*G06F 9/46* (2006.01)

(52) U.S. Cl. .................................................... 717/174
(58) Field of Classification Search .................. 717/174
See application file for complete search history.

(56) References Cited

U.S. PATENT DOCUMENTS

| 2005/0216902 A1* | 9/2005 | Schaefer | 717/168 |
| 2006/0155764 A1* | 7/2006 | Tao | 707/104.1 |

* cited by examiner

*Primary Examiner* — Don Wong
*Assistant Examiner* — Deric Ortiz
(74) *Attorney, Agent, or Firm* — Cantor Colburn LLP

(57) ABSTRACT

A method of matching one or more software plug-ins to a user, the method including: defining one or more trigger events based on one or more actions of an application; monitoring a use of the application for the one or more trigger events; generating a suggestion of one or more plug-ins based on the use of the application; and generating a notification including the suggestion.

13 Claims, 3 Drawing Sheets

MATCHING PLUG-INS TO USERS

BACKGROUND

1. Field

This disclosure relates to methods, systems, and computer program products for matching software plug-ins to users using triggers and filters.

2. Description of Background

Software design is experiencing a paradigm shift trending towards open software and plug-in frameworks. Plug-ins allow the community of developers to create their own discrete features, which can easily be installed to the base software application in order to expand the functionality. Plug-ins have become prevalent for many popular applications, such as, Eclipse, Firefox, JEdit, Wordpress and many more.

However, the popularity of plug-ins also poses a problem. With so many plug-ins, it is difficult to know what even exists and which plug-ins would benefit the user. Often times, plug-ins are promoted through word of mouth or via blogs, and many users who find out about a useful plug-in realize that it would have benefited them to have installed the plug-in months or years earlier. As such, there is a great need for automatically matching available plug-ins to the users who would benefit from the plug-in, without the user needing explicit knowledge of the plug-ins existence.

SUMMARY

The shortcomings of the prior art are overcome and additional advantages are provided through the provision of a method of matching one or more software plug-ins to a user. The method includes: defining one or more trigger events based on one or more actions of an application; monitoring a use of the application for the one or more trigger events; generating a suggestion of one or more plug-ins based on the use of the application; and generating a notification including the suggestion.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which provides systems, methods, and computer program products for automatically matching plug-ins with users and generating a notification of the matching plug-ins without the user ever having to look for new plug-ins.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

In an exemplary embodiment, systems, methods, and computer program products are provided that automatically match software plug-ins that are applicable to a particular software application to a user based on the use of the application by the user. The systems, methods, and computer program products match the software plug-ins to the user based on pre-defined trigger events and filters.

Figure 1:
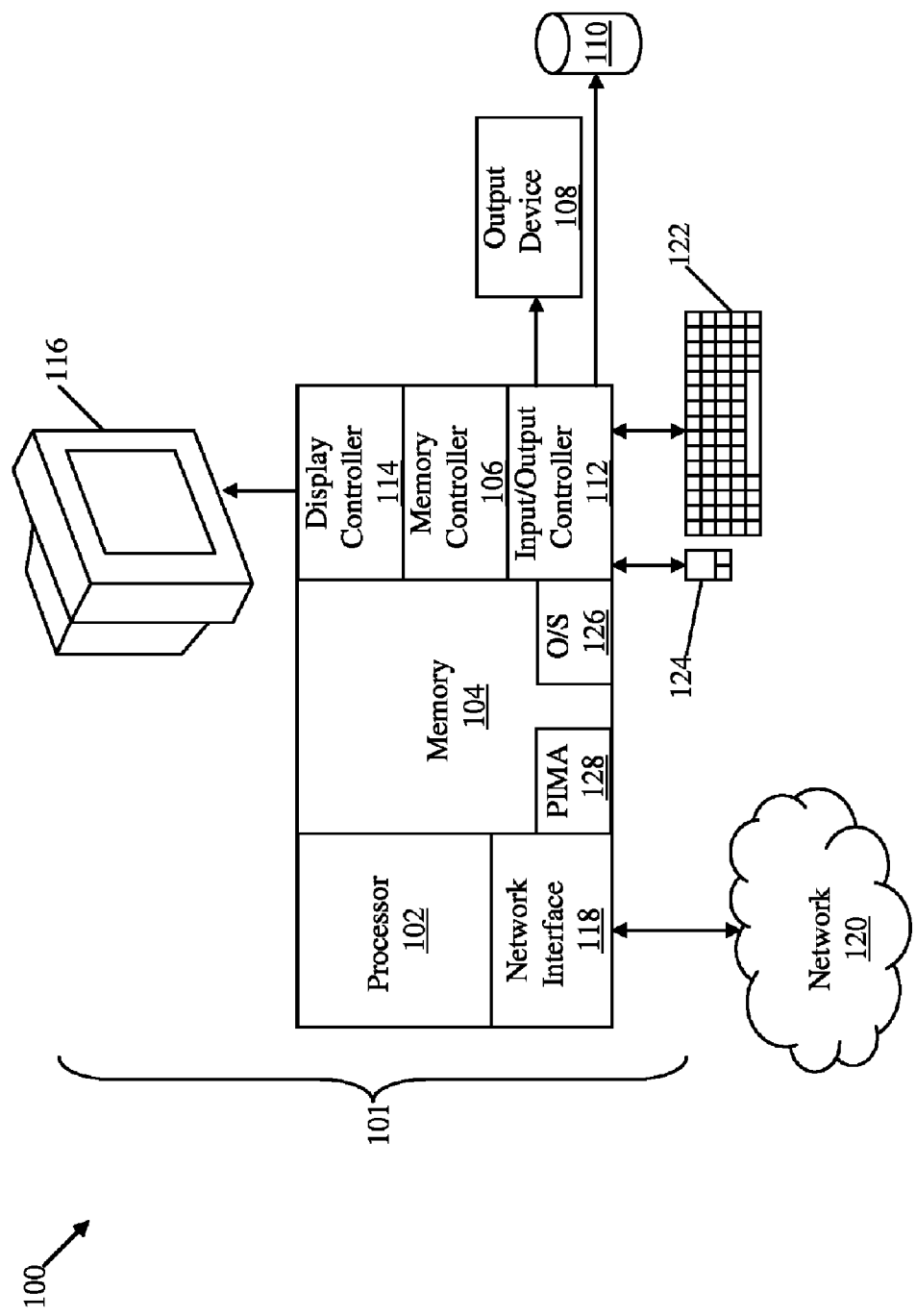
FIG. 1 is a block diagram illustrating a computing system that includes a plug-in matching system in accordance with an exemplary embodiment.

Turning now to FIG. 1, a block diagram illustrates an exemplary computing system 100 that includes a plug-in matching system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, the system 100 can further include a network interface 118 for coupling to a network 120. The network 120 transmits and receives data between the computer 101 and external systems. In an exemplary embodiment, a conventional keyboard 122 and mouse 124 can be coupled to the input/output controller 112.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include at least a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The processor 102 executes the instructions of the plug-in matching system (PIMA) 128 of the present disclosure. In various embodiments, the plug-in matching system 128 of the present disclosure is stored in the memory 104 (as shown), is executed from a portable storage device (e.g., CD-ROM, Diskette, FlashDrive, etc.) (not shown), and/or is run from a remote location such as from a central server (not shown).

Figure 2:
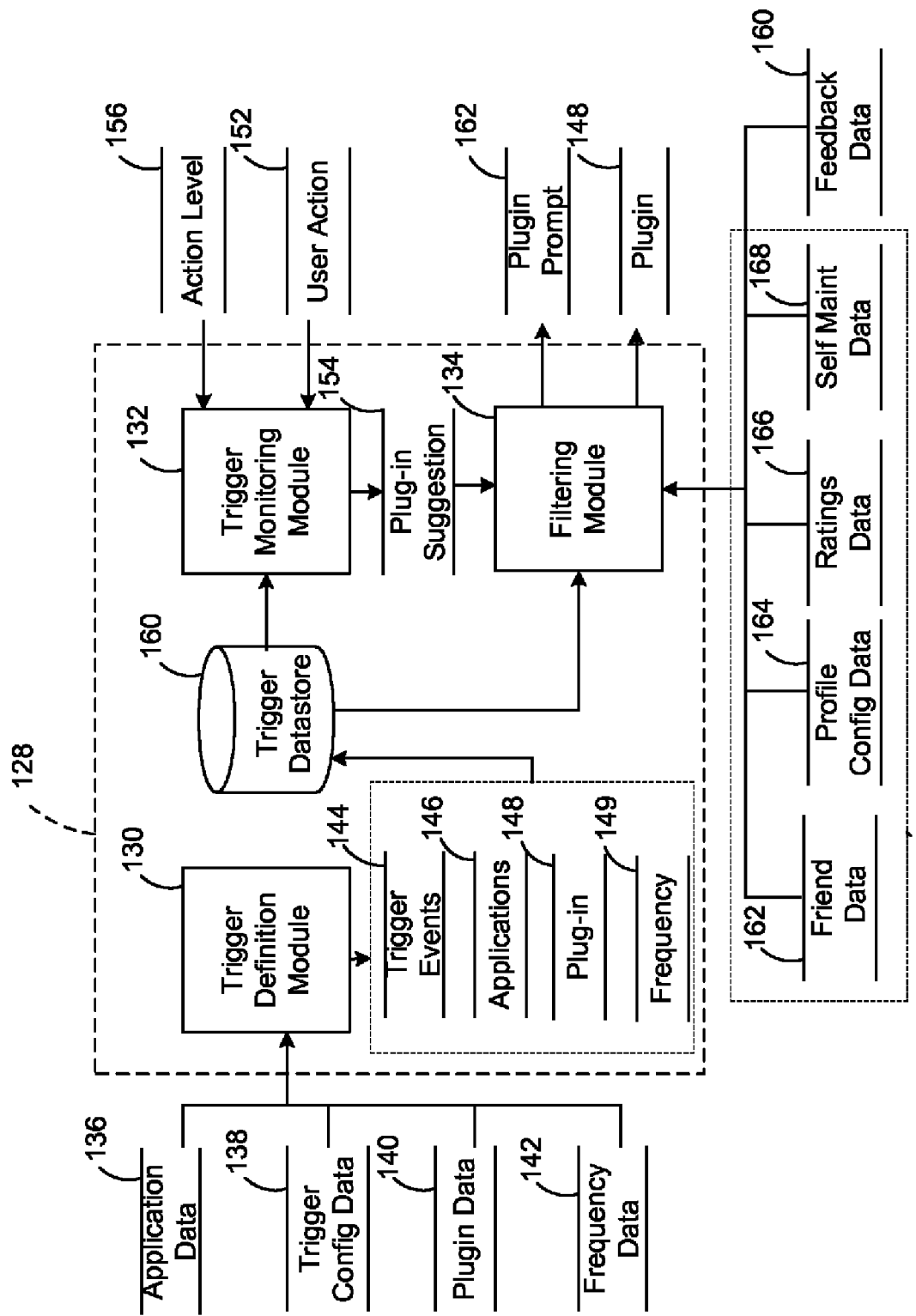
FIG. 2 is a dataflow diagram illustrating the plug-in matching system of FIG. 1 in accordance with an exemplary embodiment.

Turning now to FIG. 2, the plug-in matching system 128 is shown in accordance with an exemplary embodiment. The plug-in matching system 128 can include one or more modules and datastores. As can be appreciated, the modules can be implemented as software, hardware, firmware and/or other suitable components that provide the described functionality. As can be appreciated, the modules shown in FIG. 2 can be combined and/or further partitioned to similarly match plug-ins to users. As can be appreciated, the modules and/or datastore can all be located and run on the same computing system 100 (FIG. 1) or can be located and run on different computing systems. For example, one or modules may be run by the computer 101 (FIG. 1) while other modules may be run by a remote server (not shown). In this example, the plug-in matching system 128 includes a trigger definition module 130, a trigger monitoring module 132, and a filtering module 134, each of which are described to run on a single system.

The trigger definition module 130 receives as input software application data 136, trigger configuration data 138, plug-in data 140, and frequency data 142. Based on the inputs 136-142, the trigger definition module 130 defines one or more trigger events 144. The one or more trigger events 144 are associated with a particular application 146 and a particular plug-in 148 and stored in a trigger datastore 150. In various embodiments, the trigger definition module 130 associates the frequency data 142 with the trigger events 144. The frequency data 142 indicates a number of times in which the trigger event 144 can occur during a use of the application 146 before the associated plug-in 148 can be recommended.

In one example, plug-in developers define a set of trigger events by entering the trigger configuration data 138. In another example, a community of users can optionally redefine one or more trigger events 144 to more accurately reflect a situation where the associated plug-in 148 would be useful. As such, the developer would provide the initial trigger configuration data 138 and the community of users would refine the original trigger event 144 by entering subsequent trigger configuration data 138. The trigger events 144 can be comprised of one or more actions that a user would take within the base software application and which represent functionality of the plug-in itself. As one example, a developer who created a web development plug-in for annotating HTML source code could set a trigger action to be viewing the source of an HTML page in the browser. In another example, a developer who created a plug-in for mapping addresses within websites to their locations on a maps website would set the trigger events to be the actions of highlighting text, copying the text, and pasting the text in a designated URL (e.g., http://maps.google.com).

The trigger monitoring module 132 receives as input data from the trigger datastore 150 and user action data 152. The trigger monitoring module 132 monitors the user action data 152 to see when one or a combination of trigger events 144 occur. In various embodiments, the trigger monitoring module 132 compares the user action data 152 to the trigger events 144 from the trigger datastore 150. If the trigger event 144 is associated with frequency data 142, then when the trigger event 144 occurs a certain number of times, the trigger monitoring module 132 generates a suggested plug-in 154 based on the associated plug-in 148 stored in a trigger datastore 150. In various embodiments, the trigger monitoring module 132 optionally allows a user to configure a level of actions via an actions level 156, which allows actions at certain levels to be monitored, if any.

The filtering module 134 receives as input user configuration data 158, feedback data 160, and the suggested plug-ins 154. In various embodiments, the user configuration data 158 is configured by a user to filter out unwanted suggested plug-ins 154. In one example, the user configuration data 158 includes friend data 162, profile configuration data 164, ratings data 166, and self maintenance data 168. The user configuration data 158 and the feedback data 160 can be input by a user prior to using the software application or input during the use of the software application.

Generally speaking, based on the user configuration data 158, the filtering module 134 filters the suggested plug-ins 154. Based on the feedback data 160, the filtering module 134 generates a plug-in prompt 162, notifying the user of the suggested plug-in 154. In various embodiments, the plug-in prompt 162 notifies the user of the suggested plug-in 154 and provides the user the option of "install plug-in," "remind me later," "block this plug-in," or "block similar plug-ins." If the user selects to install the suggested plug-in 154 via the feedback data 160, the filtering module allows the user to download and install the plug-in data 140 of the associated plug-in 148 from the trigger datastore 150.

In various embodiments, the friends data 162 can be configured to allow a user to set up a buddy list, listing friends who have similar tastes. Based on the buddy list, the filtering module 134 gives priority to the suggested plug-ins 154 whose which have been installed by one or more of the friends from the buddy list.

In various embodiments, the profile configuration data 164 can be configured to allow a user to specify one or more types, a geographical location, an install rate, and/or any combination thereof. In one example, based on the type, the filtering module 134 filters out any suggested plug-ins 154 that are not categorized as such type or categorized for the use by the type of user. The type of user, for example, may include, but are not limited to, a power user, a novice, a web developer, and a general user, etc. In another example, based on the geographic location, the filtering module 134 filters out any suggested plug-ins 154 that are not associated with a specific geographic location. In yet another example, based on the install rate, the filtering module 134 filters out any suggested plug-ins 154 that have an install rate of less than a predetermined install rate. For example, if the notification versus the install rate is high, then the filtering module 134 can generate the plug-in prompt 162 or automatically install the plug-in. Conversely, if many notifications are sent for a particular plug-in, but hardly any of the users actually install the plug-in (the notification versus install rate is low), the filtering module 134 will filter out the suggested plug-ins 154 because the low install rate may indicate that inaccurate trigger events 144 were defined.

In various embodiments, the ratings data 166 can be configured to allow a user to rate plug-in developers based on whether their plug-in was useful and whether it matched the defined trigger events 144. If developers are setting inaccurate triggers, they will get lower ratings and their plug-ins will be filtered out or will be banned from the trigger datastore 156. Too many low or negative votes will block the plug-in or developer, while positive votes will give the developers plug-in preferential notifications. A user can then specify a ratings threshold via the ratings data 166 for receiving notifications. As an example, a user may only allow notifications for plug-ins whose developer has a rating of at least 8/10, or has been rated by at least 100 people. This will allow the filtering module 134 to filter out the noise and will provide incentive for plug-in developers to accurately define trigger events 144.

In various embodiments, the self maintenance data 168 is configured to allow a user to optionally configure a defined amount of time that a certain plug-in or application extension is unused. Based on the self maintenance data 168, the filtering module 134 removes the plug-in and optionally reports the infrequency or lack of use. This is performed to minimize the storage space used by the application.

In various embodiments, the feedback data 160 includes daily digest data that is configured to allow a user to optionally configure an alternative daily or weekly digest notification of plug-ins that were triggered by the daily or weekly actions, rather then sending a real-time notification.

Figure 3:
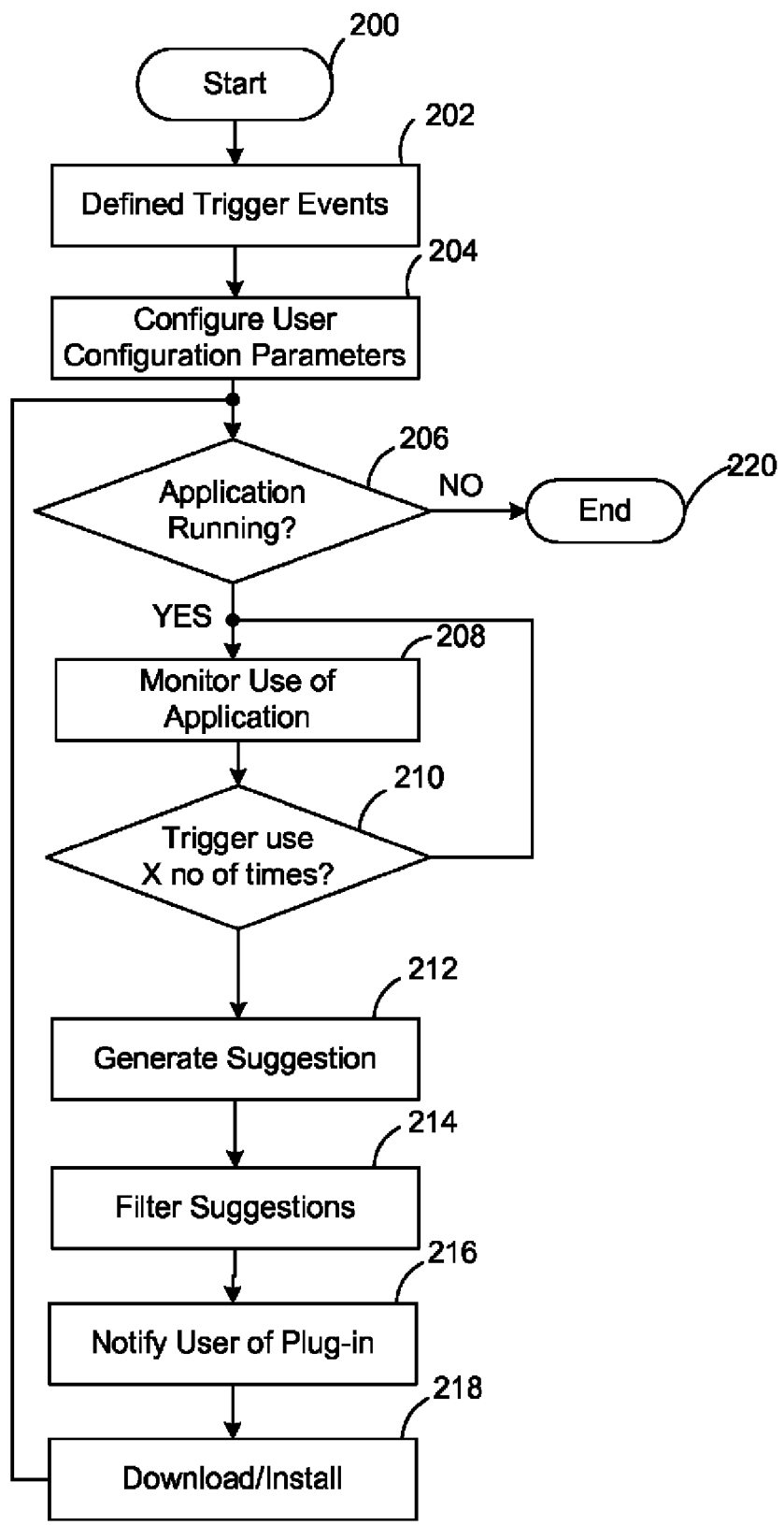
FIG. 3 is a flowchart illustrating a plug-in matching method that can be performed by the plug-in matching system of the FIG. 2 in accordance with an exemplary embodiment.

Turning now to FIG. 3, a plug-in matching method that can be performed by the plug-in matching method of FIG. 2 is shown in accordance with an exemplary embodiment. As can be appreciated in light of the disclosure, the order of operation within the method is not limited to the sequential execution as illustrated in FIG. 3, but may be performed in one or more varying orders as applicable and in accordance with the present disclosure.

In one example, the method may begin at 200. The trigger events 144 are defined based on the entering trigger of configuration data 138 by either the developer and/or the user at block 202. The user configuration data 158 is configured at block 204. Thereafter, the method proceeds once the software application is running at block 206. If the software application is running at block 206, the user actions 152 are monitored during use of the software application at block 208. If, at block 210, a predefined trigger event 144 occurs more than X number of times, one or more suggested plug-ins 154 is generated at block 212. The suggested plug-ins 154 are filtered based on the configuration data 158 at block 214. The remaining suggested plug-ins 154 are included in the plug-in prompt 162 to the user and based on the feedback data 160 at block 216. The selected suggested plug-in is installed at block 218. Thereafter, so long as the application is running at block 206, the method continues to monitor the use of the application at block 208. However, if at block 206 the application is terminated (no longer running), the method may end at 220.

As can be appreciated, the capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of matching one or more software plug-ins to a user, the method comprising:
providing a computer having a processor for executing instructions stored in a memory of the computer;
monitoring a frequency of use of an application for one or more defined events by the computer, the one or more defined events based on one or more actions of the application, and the one or more defined events occurring a predetermined number of times during the use of the application before one or more plug-ins are suggested;
generating a suggestion of one or more of the plug-ins by the computer based on the use of the application; and
generating a notification by the computer including the suggestion.

2. The method of claim 1 further comprises filtering out one or more of the plug-ins of the suggestion based on predefined configuration data.

3. The method of claim 2 further comprises configuring the configuration data based on at least one of a plug-in type, a user type, an install rate of the plug-in, a rate of use of the plug-in, plug-ins from other applications, a quality rating of the plug-in, a quality rating of the developer, and a geographic location associated with the plug-in.

4. The method of claim 1 wherein the defining the one or more trigger events is performed by a plug-in developer.

5. The method of claim 1 wherein the defining the one or more trigger events is performed by a user of the application.

6. The method of claim 1 further comprises installing one or more plug-ins of the suggestion.

7. A plug-in matching system, the system comprising:
a definition module that is executed by a computer, the definition module defining one or more events based on one or more actions of an application, the one or more defined events occurring a predetermined number of times before a plug-ins is suggested;
a monitoring module that is executed by the computer, the monitoring module monitoring a frequency of use of the application for the one or more events and generates a suggestion of the plug-ins based on the use of the application; and
a filtering module that is executed by the computer, the filtering module generating a notification indicating the suggestion.

8. The system of claim 7 wherein the filtering module filters the one or more plug-ins of the suggestion based on predefined configuration data.

9. The system of claim 8 wherein the filtering module configures the configuration data based on at least one of a plug-in type, a user type, an install rate of the plug-in, a rate of use of the plug-in, a quality rating of the plug-in, plug-ins of other applications, a quality rating of the developer, and a geographic location associated with the plug-in.

10. The system of claim 7 wherein the trigger definition module defines the one or more trigger events based on plug-in developer input.

11. The system of claim 7 wherein the trigger definition module defines the one or more trigger events based on input by a user of the application.

12. The system of claim 7 wherein the filtering module installs one or more plug-ins of the suggestion.

13. A computer program product for matching one or more plug-ins to a user, the computer program product comprising:
a computer-readable storage medium that stores instructions for executing plug-in matching, the plug-in matching comprising a method of:

defining one or more events based on one or more actions of an application, the one or more defined events occurring a predetermined number of times before a plug-ins is suggested;

monitoring a frequency of use of the application for the one or more events;

generating a suggestion of one or more of the plug-ins based on the use of the application; and generating a notification including the suggestion.

* * * * *